(12) United States Patent
Otomo (10) Patent No.: US 12,287,348 B2
(45) Date of Patent: Apr. 29, 2025

(54) AUTOSAMPLER STRUCTURE FOR DETERMINING A VERTICAL/HORIZONTAL DISTANCE BETWEEN A NEEDLE TIP AND A VIAL TOP SURFACE

(71) Applicant: Shimadzu Corporation, Kyoto (JP)

(72) Inventor: Iori Otomo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 1025 days.

(21) Appl. No.: 17/048,350

(22) PCT Filed: Jan. 9, 2019

(86) PCT No.: PCT/JP2019/000284
§ 371 (c)(1),
(2) Date: Oct. 16, 2020

(87) PCT Pub. No.: WO2019/207844
PCT Pub. Date: Oct. 31, 2019

(65) Prior Publication Data
US 2021/0181222 A1    Jun. 17, 2021

(30) Foreign Application Priority Data
Apr. 23, 2018 (JP) .................... 2018-081956

(51) Int. Cl.
*G01N 35/10* (2006.01)
*G01N 30/24* (2006.01)
*G01N 30/02* (2006.01)

(52) U.S. Cl.
CPC ......... *G01N 35/1011* (2013.01); *G01N 30/24* (2013.01); *G01N 2030/027* (2013.01)

(58) Field of Classification Search
CPC .......................... G01N 35/1011; G01N 30/24
(Continued)

(56) References Cited

U.S. PATENT DOCUMENTS 4,495,149 A * 1/1985 Iwata .................. G01N 35/00
                                                                204/461
5,443,790 A * 8/1995 Coeurveille ......... G01N 35/109
                                                                422/65
(Continued)

FOREIGN PATENT DOCUMENTS

DE    102007000729 A1 * 4/2008 ......... G01N 35/1011
GB         2541636 A * 3/2017 ............. B01L 3/021
(Continued)

OTHER PUBLICATIONS

International Search Report for PCT application PCT/JP2019/000284 dated Apr. 16, 2019 (submitted with machine translation).

*Primary Examiner* — Arlen Soderquist
(74) *Attorney, Agent, or Firm* — Muir Patent Law, PLLC (57) ABSTRACT

An autosampler includes an imaging portion configured to move in a horizontal plane direction and a vertical direction while maintaining a positional relationship with a needle. The imaging portion is configured to image a tip of the needle and top surfaces of from a position obliquely above the tip of the needle so that the tip of the needle, a top surface of a vial directly below the tip of the needle, and a top surface of a nearby vial are within a visual field. A distance between the tip of the needle and a target position is measured utilizing a visual field image of the imaging portion, and the tip of the needle is made to reach a target position based on the measured distance.

5 Claims, 5 Drawing Sheets

(58) Field of Classification Search
USPC .................................................. 422/67, 509
See application file for complete search history.

(56) References Cited

U.S. PATENT DOCUMENTS

| | | | | |
|---|---|---|---|---|
| 6,821,484 B1* | 11/2004 | Gregersen | ............... | C12M 33/04 |
| | | | | 382/128 |
| 2002/0051737 A1* | 5/2002 | Sollbohmer | ....... | G01N 35/1065 |
| | | | | 422/63 |
| 2003/0232967 A1* | 12/2003 | Chait | .................... | G01N 21/01 |
| | | | | 506/37 |
| 2006/0133965 A1* | 6/2006 | Tajima | ............... | G01N 35/1009 |
| | | | | 422/63 |
| 2006/0144331 A1* | 7/2006 | Hanafusa | ........... | G01N 35/1011 |
| | | | | 118/712 |
| 2010/0111384 A1* | 5/2010 | Nagai | ...................... | G01N 1/30 |
| | | | | 382/128 |
| 2011/0160909 A1* | 6/2011 | Glauser | .................... | B01L 3/02 |
| | | | | 700/264 |
| 2012/0033232 A1* | 2/2012 | Carr | ........................ | A61B 90/35 |
| | | | | 356/614 |
| 2013/0065797 A1* | 3/2013 | Silbert | ............... | G01N 35/1004 |
| | | | | 73/304 C |
| 2013/0205920 A1* | 8/2013 | Tow | ...................... | B29C 64/295 |
| | | | | 422/511 |
| 2013/0280143 A1* | 10/2013 | Zucchelli | .............. | G01N 35/026 |
| | | | | 422/501 |
| 2013/0288873 A1* | 10/2013 | Barbee | .................... | B04B 13/00 |
| | | | | 494/9 |
| 2014/0073517 A1* | 3/2014 | Zhou | .................. | G01N 35/1002 |
| | | | | 435/6.12 |
| 2016/0202854 A1* | 7/2016 | Minato | .................. | G01N 30/24 |
| | | | | 715/773 |
| 2016/0282380 A1* | 9/2016 | Bungo | ............... | G01N 35/1011 |
| 2017/0052205 A1* | 2/2017 | Silbert | ............... | G01N 35/0099 |
| 2017/0120235 A1* | 5/2017 | Miettinen | ............ | G02B 27/028 |
| 2017/0269115 A1* | 9/2017 | Schmidt | ................ | G06T 7/0008 |
| 2018/0259544 A1* | 9/2018 | Machiraju | ................ | B01L 9/54 |
| 2018/0341825 A1* | 11/2018 | Minato | .................. | G01N 30/24 |

FOREIGN PATENT DOCUMENTS

| | | | | |
|---|---|---|---|---|
| WO | WO-0013609 A2 * | 3/2000 | ............. | C12M 33/04 |
| WO | WO-2008062285 A2 * | 5/2008 | ......... | A61B 17/3403 |
| WO | WO-2012129105 A1 * | 9/2012 | ................ | B01L 3/56 |
| WO | WO-2014162921 A1 * | 10/2014 | ............. | G01N 30/24 |
| WO | WO-2015107644 A1 * | 7/2015 | ............. | G01N 30/16 |
| WO | 2017/037770 A1 | 3/2017 | | |

* cited by examiner

AUTOSAMPLER STRUCTURE FOR DETERMINING A VERTICAL/HORIZONTAL DISTANCE BETWEEN A NEEDLE TIP AND A VIAL TOP SURFACE

TECHNICAL FIELD

The present invention relates to an autosampler for a liquid chromatograph.

BACKGROUND OF THE INVENTION

Typically, an autosampler for a liquid chromatograph is configured such that a sample rack holding at least one vial containing a sample is placed in a predetermined position in a casing. In an autosampler, a needle for sucking and discharging a liquid from the tip of the needle is provided so as to be movable in a horizontal plane direction and in a vertical direction above a sample rack set in the casing. A sample is collected through the needle from a desired vial, and the collected sample is injected into an analysis flow path of a liquid chromatograph (see Patent Document 1).

When manufacturing, inspecting, or installing of an autosampler, or replacing a needle, it is necessary to perform the position calibration (so-called "teaching") to bring the needle to the desired position. The teaching is to make the apparatus remember the drive pulse number of the needle moving motor required for the tip of the needle to reach from the reference position (home position) to the predetermined position.

PRIOR ART DOCUMENT

Patent Document

Patent Document 1: WO2017/037770 A1
Patent Document 2: WO2014/162921 A1

SUMMARY OF THE INVENTION

Problems to be Solved by the Invention

In typical teaching, the lowering position of the needle is shifted by minute intervals in the vicinity of a specified position, and the position (the number of drive pulses) of the needle when it is visually confirmed that the tip of the needle has reached the specified position is stored in the device.

However, according to the method in which the lowering position of the needle is shifted by minute intervals, there is a problem that teaching is time-consuming and money-consuming. In particular, in cases where the operator visually determines whether or not the tip of the needle has reached the predetermined position, there is a difference in the accuracy of the teaching for each worker.

The present invention aims to eliminate the need for a visual teaching operation by an operator.

Means for Solving the Problem

The auto-sampler according to the present invention includes:

a vial arrangement portion configured to arrange a plurality of vials thereon;

a needle assembly including a needle holding portion for holding a needle with a tip of the needle facing vertically downward, the needle being configured to insert the tip into a vial arranged on the vial arrangement portion from above to suck a sample in the vial from the tip, the needle assembly being configured to move the needle holding portion in a vertical direction and a horizontal plane direction to move the needle in the horizontal plane direction and the vertical direction;

an imaging portion configured to be movable in the horizontal plane direction and the vertical direction in a state in which a positional relationship with the needle is maintained, the imaging portion being configured to image the tip of the needle from a position obliquely above the tip of the needle so that the tip of the needle, a top surface of a vial directly below the tip, and a top surface of a nearby vial are within a visual field of the imaging portion;

a correlation storing portion configured to store a correlation between a position and a size of the top surface of the vial within a visual field image of the imaging portion and a distance between the imaging portion and the vial;

a distance measuring portion configured to measure a distance between the tip of the needle and a target position above a target vial which is a vial that the tip of the needle is to be reached, in a state in which a top surface of the target vial is within the visual field image of the imaging portion together with the tip of the needle, based on a position and a size of the top surface of the target vial within the visual field image, a positional relationship between the tip of the needle and the target position above the target vial within the visual field image, and the correlation stored in the correlation storing portion; and a needle moving portion configured to control the moving mechanism to make the tip of the needle reach the target position, based on the distance measured by the distance measuring portion.

In the present invention, an imaging portion is provided. The imaging portion is configured to be movable in a horizontal plane direction and a vertical direction while maintaining a positional relationship with the needle. The imaging portion is configured to image the tip of the needle from a position obliquely above the tip of the needle so that the tip of the needle, a top surface of a vial directly below the tip, and a top surface of a nearby vial are within a visual field of the imaging portion. And, the distance between the tip of the needle and the target position is measured utilizing the visual field image of the imaging portion. Based on the calculated distance, the tip of the needle is made to reach the target position. Thus, it is possible to position the tip of the needle at the desired position without performing a visual teaching operation by the operator.

In Patent Document 2 (WO2014/162921 A1), it is disclosed to perform calibration of a needle drive by utilizing an image acquired by an imaging apparatus such as a CCD camera. In the invention disclosed in Patent Document 2, the needle is brought close to the target position while looking at the image acquired by the imaging apparatus. Then, calibration is performed using the position coordinate of the needle when it is recognized that the needle has reached the target position on the captured image. On the other hand, in the present invention, the distance between the needle and the target vial is calculated by the position and/or the size of the top surface of the target vial within the visual field image of the imaging portion, and the needle assembly is driven based on the calculated distance. In this respect, the present invention is different from Patent Document 2.

In the present invention, it is possible to automatically perform teaching using the visual field image of the imaging portion. In other words, the target vial may be a vial arranged at a predetermined position of the vial arrangement portion at the time of the teaching mode performed based on the user input. In this case, the distance measuring portion is configured to measure, during the teaching mode, the distance between the tip of the needle and the target position. The needle moving portion is configured to control the moving mechanism based on the distance measured by the distance measuring portion until the moving mechanism makes the tip of the needle reach the target position during the teaching mode. A teaching information storage portion is further provided. The teaching information storage portion is configured to store, as teaching information, the drive amount of the needle assembly for making the needle reach the target position from the preset reference position during the teaching mode.

It is preferable that the auto-sample further include a vial determination portion. The vial determination portion is configured to determine whether or not a sample vial is present directly below the needle based on the visual field image of the imaging portion when the needle has been moved to the target position. With this configuration, it is possible to determine whether or not a vial is arranged at the target position by using the visual field image of the imaging portion.

Further, the auto-sampler may be provided with a normal image storage portion configured to store, as a needle normal image, the visual field image of the imaging portion when the needle is in a normal condition, and a needle determination portion configured to determine whether or not the needle is normal by comparing the visual field image of the imaging portion with the needle normal image stored in the normal image storage portion. With this configuration, it becomes possible to detect abnormalities, such as, e.g., misalignment and/or bending of the needle, based on the visual field image of the imaging portion.

Effects of the Invention

In the auto-sampler according to the present invention, an imaging portion is provided. The imaging portion is configured to be movable in a horizontal plane direction and in a vertical direction while maintaining a positional relationship with the needle. The imaging portion is configured to image the tip of the needle from a position obliquely above the tip of the needle so that the tip of the needle, a top surface of a vial directly below the tip, and a top surface of a nearby vial are within a visual field of the imaging portion. And, it is configured such that the distance between the tip of the needle and the target position is measured utilizing the visual field image of the imaging portion and the tip of the needle is made to reach the target position based on the calculated distance. Thus, it is possible to position the tip of the needle at the desired position without performing a visual teaching operation by the operator.

EMBODIMENTS FOR CARRYING OUT THE INVENTION

Hereinafter, a preferable embodiment of an autosampler according to the present invention will be described with reference to the drawings.

Figure 1:
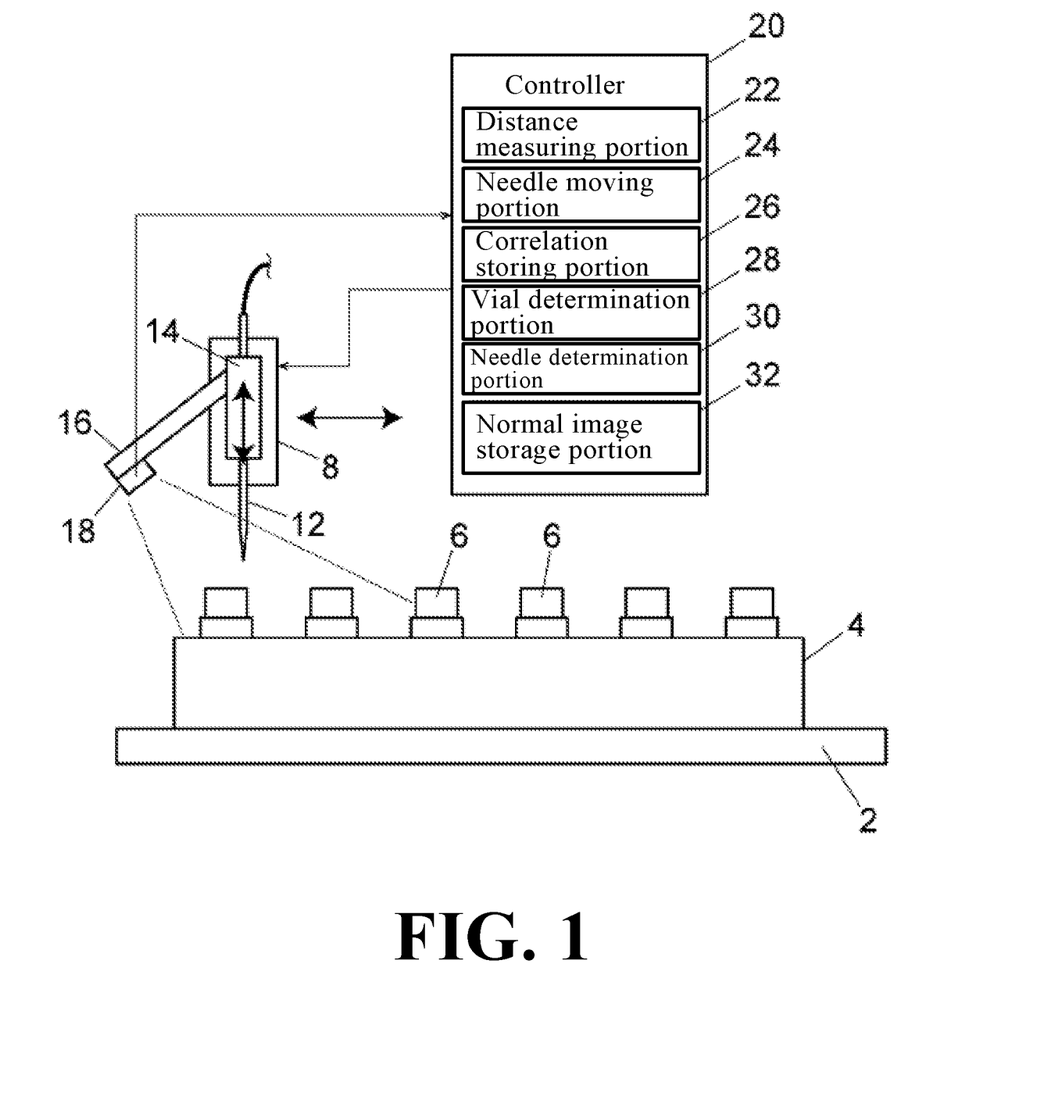
FIG. 1 is a block diagram schematically showing an example of an autosampler.

An example of an autosampler will be described with reference to FIG. 1.

The autosampler of this example is provided with a vial arrangement portion 2 for arranging vials 6 each containing a sample, a needle assembly 8 having a needle 12 for sucking a sample from a desired vial 6, and a controller 20 for controlling the operation of the needle assembly 8.

A sample rack 4 for holding a plurality of vials 6 arranged in a matrix is placed at a predetermined position on the vial arrangement portion 2. The needle assembly 8 is configured to be movable in two directions (the left-right direction and a direction perpendicular to the paper plane in the drawing) perpendicular to each other in the horizontal plane above the vial arrangement portion 2. The needle assembly 8 has a needle holding portion 14 for holding the needle 12 and is configured to move the needle holding portion 14 in the vertical direction. The needle 12 is fixed to the needle holding portion 14 with the tip of the needle 12 facing vertically downward.

An imaging portion 18 is fixed to the needle holding portion 14 of the needle assembly 8 via an arm 16. The imaging portion 18 moves in the horizontal plane direction and the vertical direction with the needle 12. The imaging portion 18 is, for example, a CCD camera. The imaging portion 18 is provided to image the tip of the needle 12 with the tip of the needle 12 from a position obliquely above the tip of the needle 12 so that the top surface of the vial 6 directly below the tip of the needle 12 and the top surface of a nearby vial 6 fall within the visual field image of view together.

The controller 20 is realized by a computer circuit provided in the autosampler or a dedicated or general-purpose computer connected to the auto-sampler. The controller 20 is provided with a distance measuring portion 22, a needle moving portion 24, a correlation storing portion 26, a vial determination portion 28, a needle determination portion 30, and a normal image storage portion 32. The distance measuring portion 22, the needle moving portion 24, the vial determination portion 28, and the needle determination portion 30 are functions obtained by executing programs by arithmetic elements such as a microcomputer provided in the controller 20. The correlation storing portion 26 and the normal image storage portion 32 are functions realized by a part of the storage area of the storage device provided in the controller 20.

The distance measuring portion 22 is configured to measure the distance between the vial 6 (hereinafter referred to as "target vial 6") to which the needle 12 is to be accessed and the tip of the needle 12 based on the visual field image of the imaging portion 18.

Figure 2:
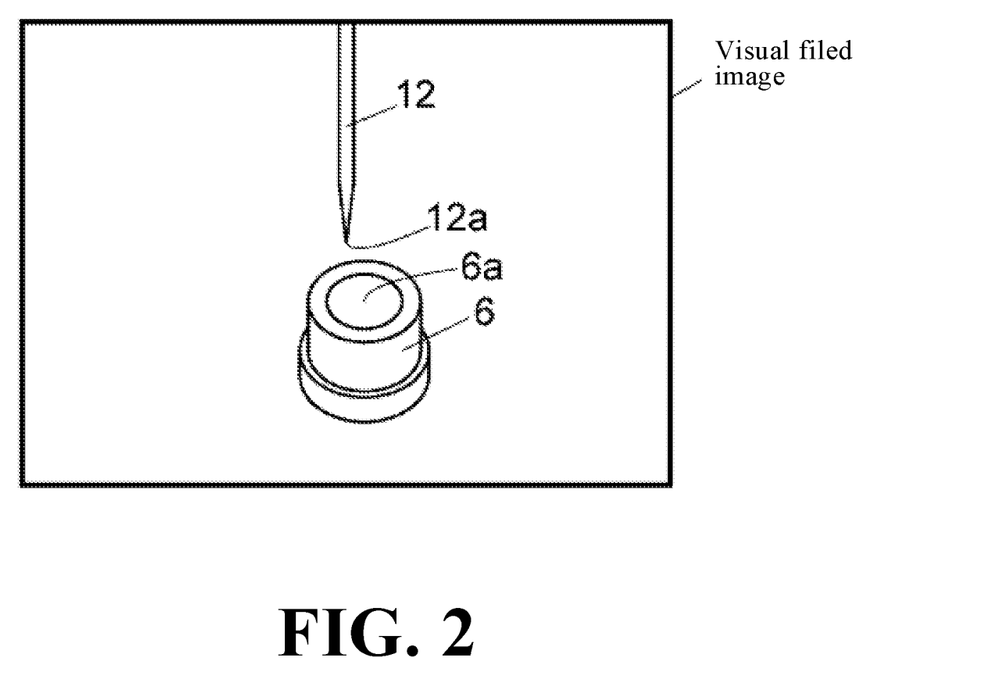
FIG. 2 is an example of a visual field image of an imaging portion of the example.

The controller 20 can grasp the approximate position of the target vial 6 and also can move the tip of the needle 12 to the position above the target vial 6. When the tip of the needle 12 is arranged above the target vial 6, as shown in FIG. 2, the top surface of the target vial 6 is imaged by the imaging portion 18 together with the tip of the needle 12. From the position and the size of the top surface (septum portion) of the target vial 6 within the visual field image of the imaging portion 18, the distance in the height direction between the imaging portion 18 and the top surface of the target vial 6 can be obtained. The correlation between the position and the size of the top surface of the vial 6 within the visual field image of the imaging portion 18 and the distance in the height direction between the imaging portion 18 (or the tip of the needle 12) and the top surface of the target vial 6 has been obtained in advance and held by the correlation storing portion 26. Further, it is possible to determine the distance between the tip of the needle 12 and the center of the top surface of the target vial 6 within the visual field image of the imaging portion 18 from the relative positional relationship between the tip of the needle 12 and the center of the top surface of the target vial 6.

The distance measuring portion 22 is configured to measure the distance between the tip of the needle 12 and the center of the top surface of the target vial 6 in the horizontal plane direction and the vertical direction, based on: the position and the size of the top surface of the target vial 6 within the visual field image captured by the imaging portion 18 when the tip of the needle 12 has moved to the position above the target vial 6; and the relative positional relationship between the tip of the needle 12 and the center of the top surface of the target vial 6.

The needle moving portion 24 is configured to perform the drive control of the needle assembly 8 based on the distance measured by the distance measuring portion 22 such that the needle 12 approaches the target position.

The vial determination portion 28 is configured to determine the presence or absence of the target vial 6 depending on whether or not the target vial 6 is present within the visual field image of imaging portion 18 when, for example, the needle 12 has been moved to the position where the target vial 6 is arranged. The vial determination portion 28 may be configured to emit a warning when no target vial 6 to be placed is present within the visual field image of the imaging portion 18. The warning may be performed by displaying an image or by emitting a sound. Note that the vial determination portion 28 is not an essential component.

The needle determination portion 30 is configured to determine whether or not there is an abnormality in the needle 12 by comparing the needle 12 within the visual field image of the imaging portion 18 with the needle within the visual field image of the imaging portion 18 when the needle 12 is normal (hereinafter referred to as "normal image"). The normal image captured in advance is stored in the normal image storage portion 32. When the state of the needle 12 within the visual field image of the imaging portion 18 does not coincide with the state of the needle 12 within the normal image, the needle determination portion 30 determines that the needle 12 is abnormal. The determination of whether or not the needle 12 is abnormal can be made, for example, by determining whether or not the difference (the number of pixels) in the position of the tip of the needle 12 is within a preset tolerance. When there is an abnormality in the needle 12, the needle determination portion 30 may be configured to emit a warning. The warning may be performed by displaying an image or by emitting a sound. Note that the needle determination portion 30 is not an essential element.

Figure 3:
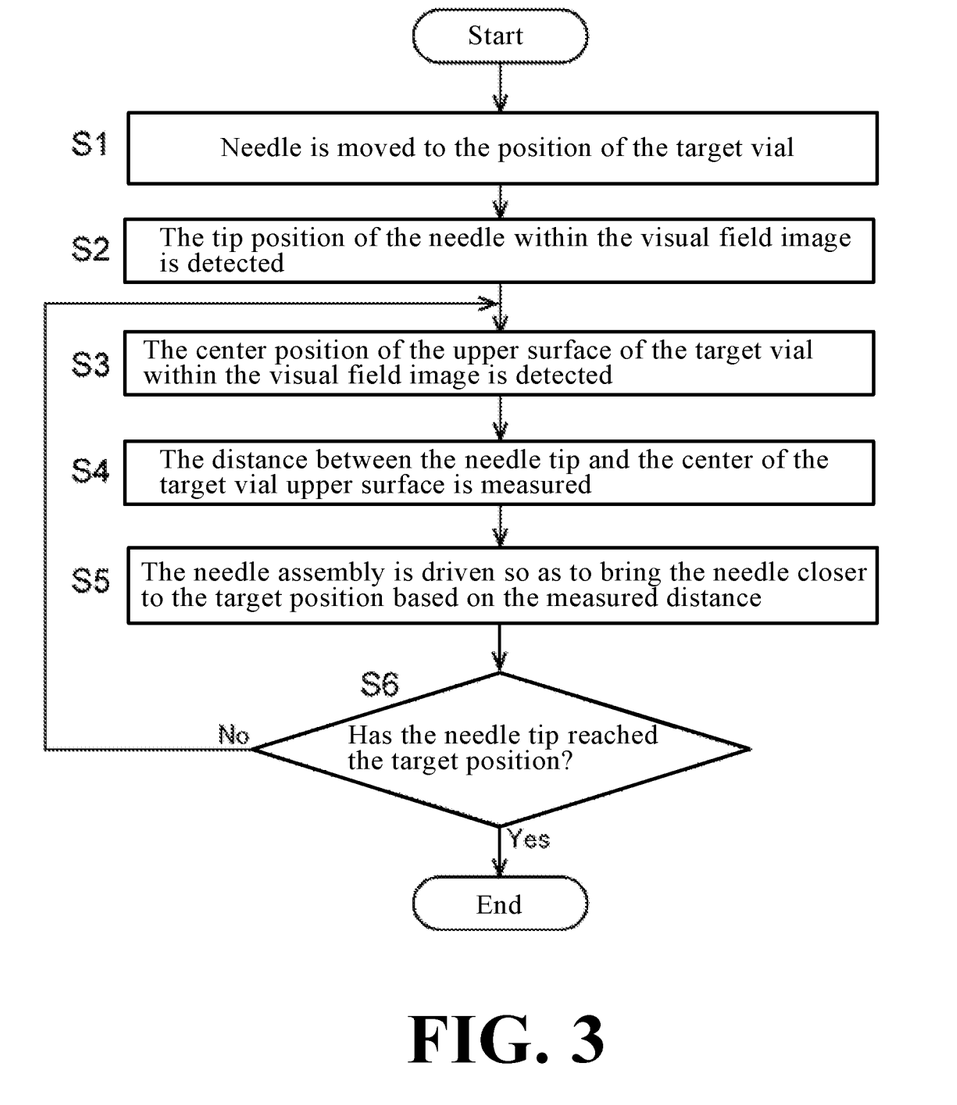
FIG. 3 is a flowchart showing an example of a needle positioning operation of the example.

Next, an exemplary positioning operation of the tip of the needle 12 will be described with reference to the flowchart of FIG. 3 together with FIG. 1 and FIG. 2.

First, the needle 12 is moved to the approximate position above the target vial 6 (Step S1). At this time, as shown in FIG. 2, the top surface of the target vial 6 is within the visual field image of the imaging portion 18 together with the tip of the needle 12. The distance measuring portion 22 detects the position of the tip 12a of the needle 12 within the visual field image of the imaging portion 18 (Step S2) and then detects the position of the center 6a of the top surface of the target vial 6 (Step S3). Then, the distance measuring portion 22 obtains the distance between the tip 12a of the needle 12 and the center 6a of the top surface of the target vial 6 from the position and the size (area value) of the top surface of the target vial 6 of the imaging portion 18 and the relative positional relationship between the tip 12a of the needle 12 and the center 6a of the top surface of the target vial 6 within the visual field image (Step S4).

When the distance between the tip 12a of the needle 12 and the center 6a of the top surface of the target vial 6 is measured by the distance measuring portion 22, the needle moving portion 24 drives the needle assembly 8 based on the distance measured by the distance measuring portion 22 so as to bring the tip of the needle 12 closer to the target position set directly above the target vial 6 (e.g., 2 mm directly above the center 6a) (Step S5). After driving the needle assembly 8, it is determined whether or not the tip 12a of the needle 12 has reached the target position based on the visual field image of the imaging portion 18 (Step S6). When the tip 12a of the needle 12 has reached the target position, the positioning of the needle 12 is completed.

On the other hand, when the tip 12a of the needle 12 has not reached the target position, a series of operations of the detection of the center 6a of the top surface of the target vial 6 within the visual field image of the imaging portion 18 by the distance measuring portion 22 (Step S3), the measurement of the distance between the tip 12a of the needle 12 and the center 6a of the top surface of the target vial 6 by the distance measuring portion 22 (Step S4), and the driving of the needle assembly 8 by the needle moving portion 24 (Step S5) are performed until the tip 12a of the needle 12 reaches the target position (Step S6).

In the above example, the embodiment is described in which the direct positioning of the needle 12 with respect to the target vial 6 is performed using the visual field image of the imaging portion 18. However, the present invention is not limited to this. The functions of the distance measuring portion 22 and the needle moving portion 24 may be used for the position calibration (teaching) of the needle 12. By acquiring the drive amount of the needle assembly 8 required to reach the predetermined teaching position on the vial arrangement portion 2 from the reference position of the needle 12 and storing it in the apparatus, it is possible to correctly make the needle 12 access the desired vial 6 by using the relative positional relationship between the teaching position and the position where each vial 6 is arranged.

Figure 4:
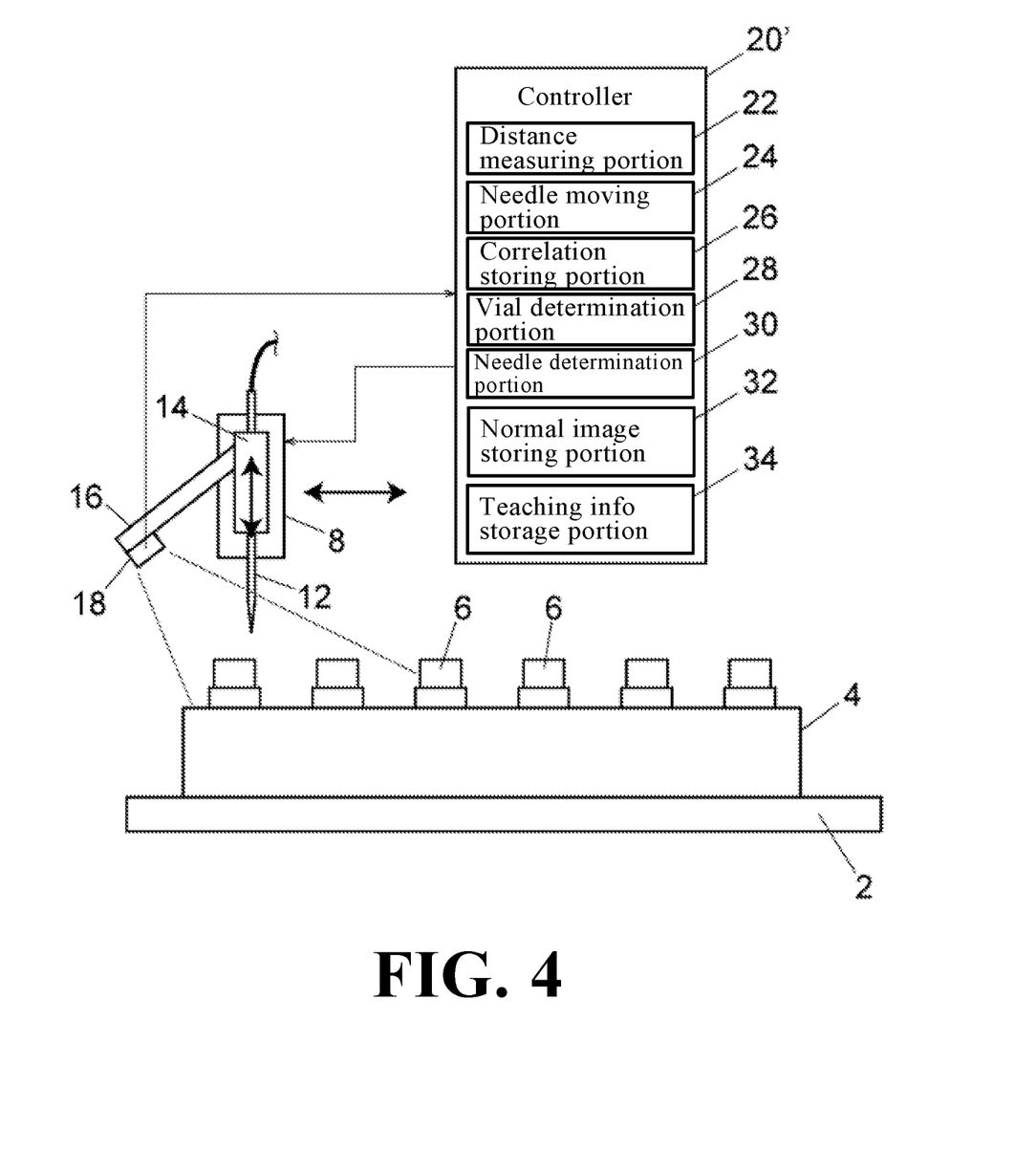
FIG. 4 is a block diagram schematically showing another example of an autosampler.

An example of the autosampler that executes teaching using the visual field image of the imaging portion 18 will be described with reference to FIG. 4.

The example of FIG. 4 has the same basic configuration as that of the example described with reference to FIG. 1. The controller 20' in this example is provided with a teaching information storage portion 34 in addition to the function of the controller 20 of the example of FIG. 1. The distance measuring portion 22 and the needle moving portion 24 of the controller 20' are functions that are enabled during the teaching mode executed based on the user input. The teaching information storage portion 34 is configured to store, as teaching information, the drive amount of the needle assembly 8 required to make the tip of the needle 12 reach the target position on the target vial 6 arranged at a predetermined teaching position using the functions of the distance measuring portion 22 and the needle moving portion 24. The teaching information storage portion 34 is a function realized by a part of the storage area of the storage device provided in the controller 20'.

Figure 5:
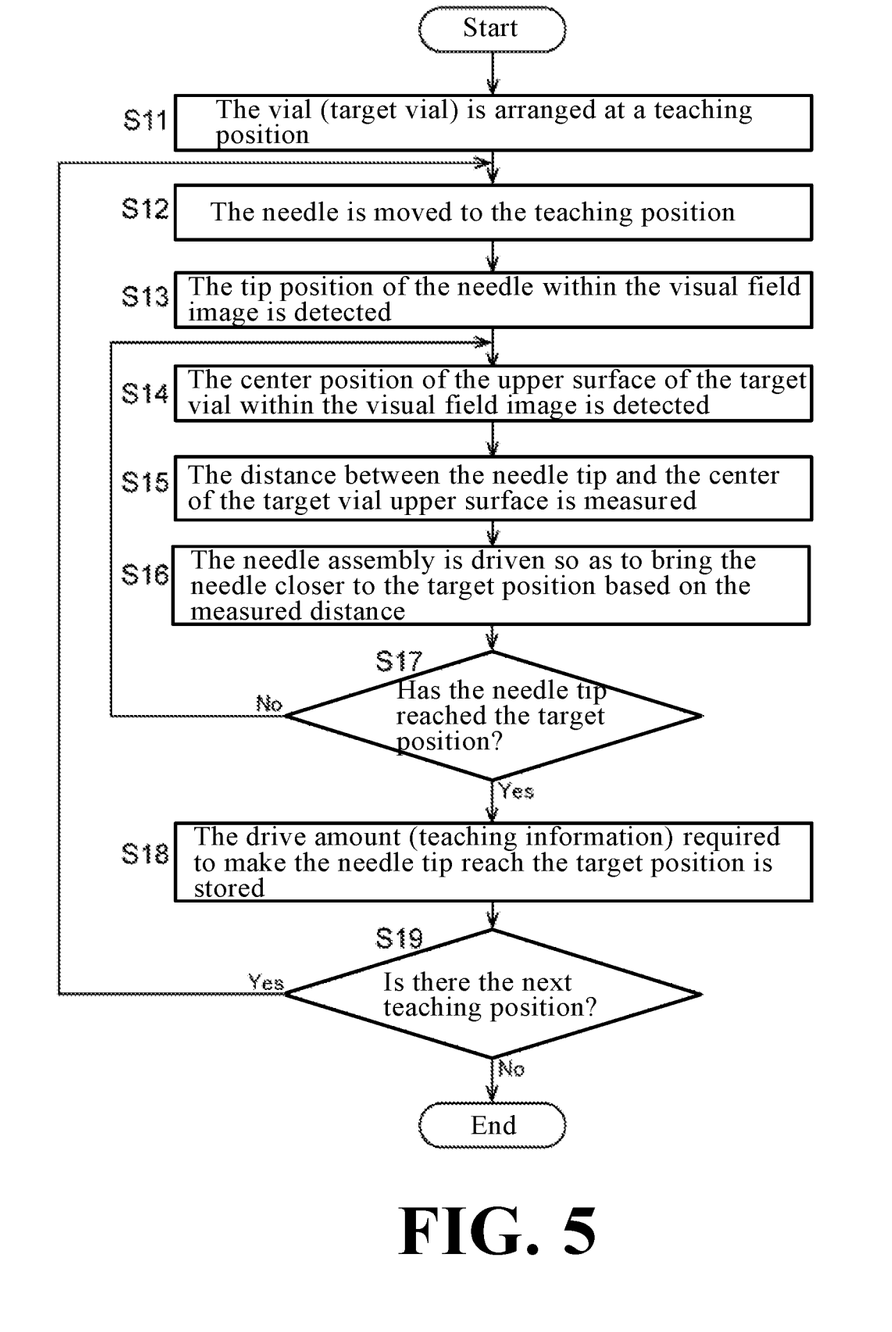
FIG. 5 is a flowchart showing an example of an operation during the teaching mode of the example.

The operation during the teaching performed in the autosampler of this example will be described with reference to the flowchart of FIG. 5.

First, the user arranges a vial 6 at a predetermined teaching position (Step S11). In the teaching mode, the vial 6 arranged at the teaching position is a target vial. The needle 12 is moved from the home position to the teaching position (approximate position above the target vial 6) (Step S12).

The distance measuring portion 22 detects the position of the tip 12a of the needle 12 within the visual field image of the imaging portion 18 (Step S13) and then detects the position of the center 6a of the top surface of the target vial 6 (Step S14). The distance measuring portion 22 determines the distance between the tip 12a of the needle 12 and the center 6a of the top surface of the target vial 6 from the position and the size (area value) of the top surface of the target vial 6 within the visual field image of the imaging portion 18, and the relative positional relationship between the tip 12a of the needle 12 and the center 6a of the top surface of the target vial 6 within the visual field image of the imaging portion (Step S15).

When the distance between the tip 12a of the needle 12 and the center 6a of the top surface of the target vial 6 is measured by the distance measuring portion 22, the needle moving portion 24 drives the needle assembly 8 by the distance measuring portion 22 based on the distance measured to bring the tip of the needle 12 closer to the target position set directly above the target vial 6 (Step S16). After the needle assembly 8 is driven, it is determined whether or not the tip 12a of the needle 12 has reached the target position based on the visual field image of the imaging portion 18 (Step S17). When the tip 12a of the needle 12 has reached the target position, the drive amount of the needle assembly 8 required to make the needle 12 reach the target position from the home position is stored in the teaching information storage portion 34 as the teaching information (Step S18).

On the other hand, when the tip 12a of the needle 12 has not reached the target position, the operations of the above-described Steps S14 to S16 are repeated. In cases where a plurality of teaching positions are set, the above operations are repeated in each teaching position (Step S19).

The controller 20' has a function of positioning the needle 12 to a desired vial 6 in normal operation by using the teaching information acquired by the above operations.

As described above, the autosampler provided with the imaging portion 18 can make the needle 12 access the desired vial 6 without the need for a visual teaching operation.

DESCRIPTION OF SYMBOLS

2: Vial arrangement portion
4: Sample rack
6: Vial
6a: Center of a top surface of a vial
8: Needle assembly
12: Needle
12a: Needle tip
14: Needle holding portion
16: Arm
18: Imaging portion
20, 20': Controller
22: Distance measuring portion
24: Needle moving portion
26: Correlation storing portion
28: Vial determination portion
30: Needle determination portion
32: Normal image storage portion
34: Teaching information storage portion

The invention claimed is:

1. An autosampler comprising:
a vial arrangement portion configured to arrange a plurality of vials thereon;
a needle assembly including a needle holding portion for holding a needle with a tip of the needle facing vertically downward, the needle being configured to insert the tip into a vial arranged on the vial arrangement portion from above to suck a sample in the vial from the tip, the needle assembly being configured to move the needle holding portion in a vertical direction and a horizontal plane direction to move the needle in the vertical direction and the horizontal plane direction;
an imaging portion configured to be movable in the horizontal plane direction and the vertical direction in a state in which a positional relationship with the needle is maintained, the imaging portion being configured to image the tip of the needle and a top surface of a vial directly below the tip from a position obliquely above the tip of the needle;
a correlation storing portion configured to store a correlation between a position and a size of the top surface of the vial within a visual field image of the imaging portion and a vertical distance between the imaging portion and the vial;
a distance measuring portion configured to measure a horizontal distance and a vertical distance between the tip of the needle and a target position above a target vial which is a vial that the tip of the needle is to be reached, in a state in which a top surface of the target vial is within the visual field image of the imaging portion together with the tip of the needle, based on a position and a size of the top surface of the target vial within the visual field image, a positional relationship between the tip of the needle and the target position above the target vial within the visual field image, and the correlation stored in the correlation storing portion; and
a needle moving portion configured to control a moving mechanism to make the tip of the needle reach the target position, based on the horizontal distance and the vertical distance measured by the distance measuring portion.

2. The autosampler as recited in claim 1,
wherein the target vial is a vial arranged at a predetermined position of the vial arrangement portion during a teaching mode performed based on a user input,
wherein the distance measuring portion is configured to measure the horizontal distance and the vertical distance between the tip of the needle and the target position during the teaching mode,
wherein the needle moving portion is configured to control the moving mechanism to make the tip of the needle reach the target position using the distance measured by the distance measuring portion during the teaching mode, and
wherein the autosampler further comprises a teaching information storage portion configured to store a drive amount of the needle assembly as teaching information, the drive amount being an amount required for the needle to reach the target position from a preset reference position during the teaching mode.

3. The autosampler as recited in claim 1, further comprising:
a vial determination portion configured to determine whether or not a sample vial is present directly below the needle based on the visual field image of the imaging portion when the needle has been moved to the target position.

4. The autosampler as recited in claim 1, further comprising:
a normal image storage portion configured to store the visual field image of the imaging portion when the needle is in a normal condition as a needle normal image; and
a needle determination portion configured to determine whether or not the needle is normal by comparing the visual field image of the imaging portion with the needle normal image stored in the normal image storage portion.

5. An autosampler comprising:
a vial arrangement portion;
a sample rack on the vial arrangement portion, the sample rack having vial holders arranged in a matrix;
a target vial disposed in a vial holder of the vial holders arranged in a matrix;
a needle assembly including a needle holder and a needle held by the needle holder with a needle with a tip of the needle facing downward, the needle assembly being configured to move the needle holder in a vertical direction and a horizontal plane direction;
an image sensor secured to the needle assembly to maintain a positional relationship with the needle, the image sensor positioned obliquely above the tip of the needle and oriented with the tip of the needle and a top surface of the target vial in a field of view of the image sensor; and
a controller configured to:
store a correlation between a size and position of the top surface of the target vial as viewed by the image sensor and a vertical distance between the image sensor and the top surface of the target vial;
determine the vertical distance between the image sensor and the top surface of the target vial based on the size of top surface of the target vial as viewed by image sensor;
determine the horizontal distance between the tip of the needle and the center of the top surface of the target vial based on a relative positional relationship between the tip of the needle and the center of the top surface of the target vial as viewed by the image sensor and the determined vertical distance;
cause the needle holder to move horizontally to position the tip of the needle over the center of the top surface of the target vial based on the determined horizontal distance; and
cause the needle holder to move vertically.

* * * * *